(12) United States Patent
Kakehi

(10) Patent No.: US 6,270,044 B1
(45) Date of Patent: Aug. 7, 2001

(54) COMPONENT HOLDING WELD BRACKET

(75) Inventor: Toshinori Kakehi, Toyohashi (JP)

(73) Assignee: Emhart Inc., Newark, DE (US)

( * ) Notice: Subject to any disclaimer, the term of this patent is extended or adjusted under 35 U.S.C. 154(b) by 0 days.

(21) Appl. No.: 09/416,328

(22) Filed: Oct. 12, 1999

(30) Foreign Application Priority Data

Oct. 13, 1998 (JP) .................................................. 10-290437

(51) Int. Cl.[7] .................................................. F16M 11/00
(52) U.S. Cl. .......................... 248/200; 228/175; 248/300; 403/270
(58) Field of Search .................................... 248/200, 300; 403/220, 271, 272; 228/175

(56) References Cited

U.S. PATENT DOCUMENTS

| | | | |
|---|---|---|---|
| 4,168,795 | * | 9/1979 | Bennett ................................. 228/175 |
| 4,188,149 | * | 2/1980 | Gray ...................................... 403/271 |
| 5,806,813 | * | 9/1998 | Binelli ................................... 248/73 |

FOREIGN PATENT DOCUMENTS 08019865   1/1996  (JP) .

* cited by examiner

Primary Examiner—Ramon O. Ramirez
(74) Attorney, Agent, or Firm—Edward D. Murphy

(57) ABSTRACT

In a plate-like component holding bracket (1) having a certain thickness, a welding portion (5) to be welded to a base member includes an end surface along one of the sides. The end surface is adapted to come into contact with the surface of the base member. Along the end surface of the side of the elding portion (5), non-welding portions (6) are provided adjacent to the welding portion (5), and discharge arc anti-transferring grooves (7) are formed between the welding portion (5) and the non-welding portions (6) to prevent discharge arc from transferring to the non-welding portions (6). The end surface of each non-welding portion (6) is formed at such a height (H) that is measured from the end surface of the welding portion (5) apart from the surface of the base member. The height (H) is effective to predetermine the height of the welded bracket.

6 Claims, 4 Drawing Sheets

COMPONENT HOLDING WELD BRACKET

BACKGROUND OF THE INVENTION

The present invention relates to a component holding weld bracket, typically to such a bracket that is adapted for use for attachment of various components to be equipped on the car body.

In order to attach various components to be equipped on the car body, it is practically performed to weld a bracket to the car body and then to attach desired components on this bracket. One of techniques for welding a bracket to the car body is disclosed in Japanese Patent Publication No. 08-019865. This publication discloses that a bracket is made of a L-shaped flat plate-like member, one portion of the L-shaped bracket is held in the tip of the gun of a welding machine and the other portion of the bracket perpendicular to the above mentioned one portion is welded to the car body. The upright portion standing from the welded portion is used to attach the components. This publication describes that, as the gun of welding machine holding the bracket to be welded can be positioned at any desired position on the car body for welding, it is unnecessary to previously position the bracket by using any fastener.

In the prior welding art as above described, there was a problem in that the heights of the welding portions of the brackets after welded were uneven, and accordingly, the heights of the attached components were uneven.

Therefore, it is an object of the present invention to provide a component holding weld bracket that minimizes the unevenness of the height of the welded bracket.

SUMMARY OF THE INVENTION

To accomplish the above object, according to the present invention, a plate-like component holding weld bracket having a certain thickness is provided. The bracket includes an end surface along one of the sides thereof as a welding portion to be welded to a base member, the end surface being adapted to contact the surface of the base member; the bracket also includes a non-welding portion along the same side of the bracket as the welding portion and adjacent to the welding portion; an arc-obstructing groove is formed on the boundary between the welding portion and the non-welding portion to prevent the discharge arc from transferring from the welding portion to the non-welding portion; and the end surface of the non-welding portion is formed to have such a length that it is spaced from the surface of the base member when the end surface of the welding portion is in contact with the base member.

The non-welding portion to which a discharge arc can't be transferred is provided adjacent to the welding portion, and the non-welding portion is formed at such a position that it is spaced from the base member by a predetermined height from the welding portion. When the molten welding portion is pushed against the base member, the end surfaces of the non-welding portion comes into contact with the base member to restrain further movement of the bracket to the base member, and thereby to define the height of the welded bracket. Accordingly, by forming such a bracket that includes the stepped non-welding portion having a predetermined height, the height of the welded bracket can be easily controlled, so the unevenness of the height of the bracket after welded can be minimized.

In the bracket of the present invention, a portion including both the welding portion and one or more non-welding portions may be formed in a square plate-like member, and the non-welding portions may be disposed at the opposite sides of the single welding portion so that there exists a U shaped arc-obstructing groove on each of the boundaries between the welding portion and the non-welding portions. Further, a single welding portion may be formed at the center of the bracket, and the non-welding portions may be disposed at the opposite sides of the welding portion to have the arc-obstructing grooves between the welding portion and the non-welding portions with each non-welding portion being made of a plate-like member bent perpendicular to a plane including the welding portion.

In accordance with the present invention, the side of the welding portion to be welded to a base member is the end surface of the bracket and the non-welding portion to which a discharge arc can't be transferred is disposed adjacent to the welding portion, and the non-welding portion is positioned so that it is more apart from the base member than the welding portion by a predetermined height. If the molten welding portion is pushed against the base member, the end surfaces of the non-welding portion comes into contact with the base member to restrain further movement of the bracket to the base member, and thereby to define the height of the welded bracket. Thus, by selecting the height of the non-welding portion, the height of the bracket after welded can be easily controlled. Accordingly, the unevenness of the height of the bracket after welded can be minimized.

BRIEF DESCRIPTION OF THE ACCOMPANYING DRAWINGS

DETAILED DESCRIPTION OF THE INVENTION

In accordance with the present invention, the side of the welding portion to be welded to a base member is the end surface of the bracket and the non-welding portion to which a discharge arc can't be transferred is disposed adjacent to the welding portion, and the non-welding portion is positioned so that it is spaced further from the base member than the welding portion by a predetermined height. If the molten welding portion is pushed against the base member, the end surfaces of the non-welding portion comes into contact with the base member to restrain further movement of the bracket to the base member, and thereby to define the height of the welded bracket. Thus, by selecting the height of the non-welding portion, the height of the bracket after welding can be easily controlled. Accordingly, the unevenness of the height of the bracket after welding can be minimized.

Figure 1:
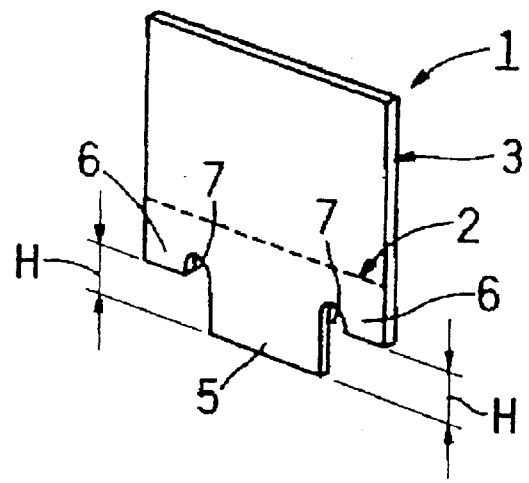
FIG. 1 is a perspective view of the weld bracket in accordance with the present invention.

Referring now to the drawings, the embodiments of the present invention are explained. FIG. 1 shows a component holding weld bracket as a first embodiment of the present invention. The weld bracket 1 is made of weldable metal, and is formed in a plate-like member having a certain thickness. For the convenience of illustration, the bracket 1 is shown as formed into a generally square flat plate. A lower portion below a dotted line provides a welding area 2, while it's upper portion provides a component holding area 3 for holding the components. The shape of the component holding area 3 is not limited to the illustrated shape, and it may be any suitable shape for the component to be held. For example, in the case of the illustrated shape, a component engaging hole or a bolt inserting hole may be formed at the center of the component holding area 3 to engage a mating portion of the component on this area 3. Also, a clip or clamp may be provided in this component holding area 3 to hold other components. Accordingly, the component holding area 3 may be of any shape, including the illustrated shape.

In the weld bracket 1, a welding portion 5 is formed on and along the bottom side of the welding area 2. In the present invention, the welding surface of the welding portion 5, that is, the surface that will come into contact with the base member is an end surface of the bottom side, which provides a small area that is equal to the product of the width of the welding portion and the thickness of the bracket 1. At each of the opposite sides of the welding portion 5, a non-welding portion 6 is formed adjacent to the welding portion 5. Between the welding portion 5 and the non-welding portion 6, that is, on each of the boundaries between the welding portion 5 and the non-welding portions 6, a U shaped arc-obstructing groove 7 is formed to prevent a discharge arc from transferring from the welding portion 5 to the non-welding portions 6 during welding. This groove may be of any shape as long as it prevents the discharge arc from transferring from the welding portion to the non-welding portions during welding. Also, the end surface of the non-welding portion 6 is formed to be positioned at such a height (H) as measured from the end surface of the welding portion 5 so that it is spaced apart from the surface of the base member by the distance H when the end surface of the welding portion 5 contacts with the base member in FIG. 1. The height H defines the movement of the bracket 1 as it is welded to the base member or the car body. That is, with the welding portion 5 being in a molten state, when the bracket 1 is pushed against the base member, the whole of the bracket 1 moves toward the base member. However, when the bracket 1 moves only by an amount of the height H, it can't move further, and therefore the welding portion 5 can't move further toward the base member, because the non-welding portions 6 are not molten. In other words, the height of the entire bracket 1 after welded is controlled by the height of the stepped or offset non-welding portions 6 formed adjacent to the welding portion 5. In this way, the length of movement of the welding portion 5, and therefore the height of the bracket 1 from the base member is determined by the height H of the non-welding portions 6.

Figure 2:
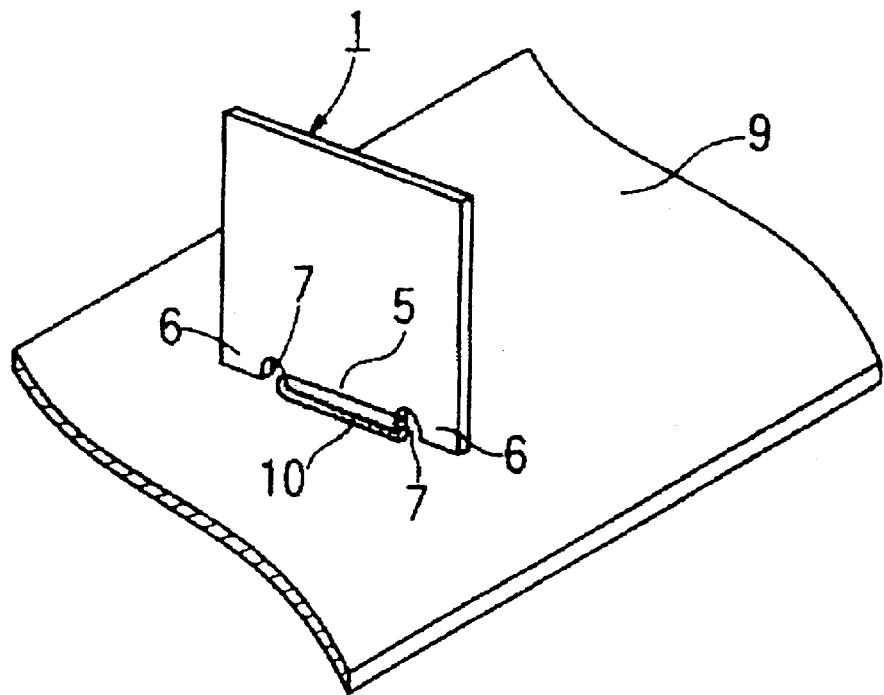
FIG. 2 shows the condition that the bracket of FIG. 1 has been welded.

FIG. 2 shows the condition of the weld bracket 1 welded to the base member 9 or the car body. For example, welding is performed by an arc welding method (referred to as Drawn Arc Method) as follows. First, the weld bracket 1 is held in a gun of the welding machine. Next, the bracket 1 is moved toward the base member to come into contact with the base member and generate a discharge arc of small current (referred to as a pilot arc) between the weld bracket 1 held in the gun of the welding machine and the base member, in inert gas atmosphere. Then, the bracket 1 is pulled up from the base member to produce a discharge arc of large current (referred as to a main arc) between the weld bracket 1 held in the gun of welding machine and the base member so as to melt both the tip of the welding portion 5 of the bracket 1 and the welding area of the base member, and then bring the molten tip of the welding portion 5 into contact with the base member in proper timed relationship.

By pushing the weld bracket 1, the molten tip 10 of the welding portion 5 of the bracket 1 is moved into the corresponding molten area of the base member 9. On the other hand, because the discharge arc in welding portion 5 is prevented from transferring from the welding portion 5 to the non-welding portions 6, no arc discharge occurs on the non-welding portion. Thus, the movement of the bracket 1 to the base member 9 continues until the non-welding portions 6 come into contact with the surface of the base member 9, and stops when the non-welding portions abut on the surface of the base member 9. When the welding portion 5 abuts on the base member 9, supplying of welding current from the gun of the welding machine is shut off in timed relationship. This stops the arc discharge, and allow both molten portion of the tip 10 of the welding portion 5 and molten portion of the base member to be solidified, whereby the bracket is welded to the base member 9. In this way, the length of movement of the bracket 1 to the base member 9 (that is, the height of the welded bracket 1 from the surface of the base member 9) is easily and surely controlled by selecting the height H from the welding portion 5 to the non-welding portions 6 before welding.

Figure 3:
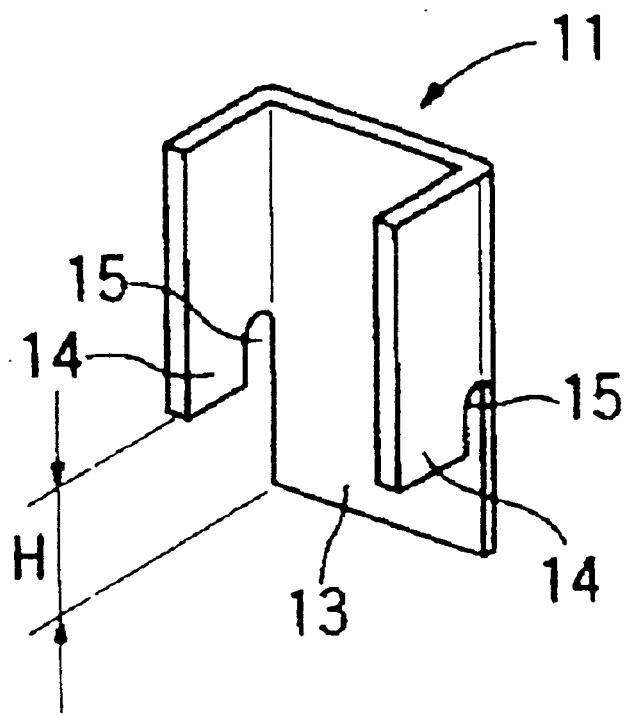
FIG. 3 is a respective view of the weld bracket in accordance with the second embodiment of the present invention.

FIG. 3 shows a weld bracket 11 having a different shape from the bracket of FIG. 1. The bracket 11 includes a single flat plate-like welding portion 13 formed at the center of it. On each of the opposite sides of the welding portion 13, the non-welding portion 14 is disposed and is made of a plate-like member that is bent at an angle of 90 degrees relative to a plane including the welding portion 13. Also, U shaped arc-obstructing grooves 15 are formed between the welding portion 13 and the non-welding portions 14. As described previously, the end surfaces of the non-welding portions 14 are formed at a different level from the end surface of the weld portion 13 so as to have a desired height H that is calculated from the height of the bracket 11 after welded. In the embodiment of FIG. 3, the non-welding portions 14 are formed with an angle of 90 degrees relative to the welding portion 13. Thus, the strength of the bracket 11 can be increased without increasing the size of entire bracket, and the welding strength to the base member after welding can be more increased than in the case of the simple flat plate bracket.

Figure 4:
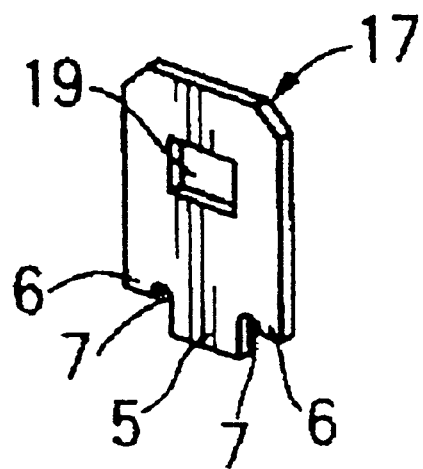
FIG. 4 is a perspective view of the weld bracket for use in attaching a footrest.
Figure 5:
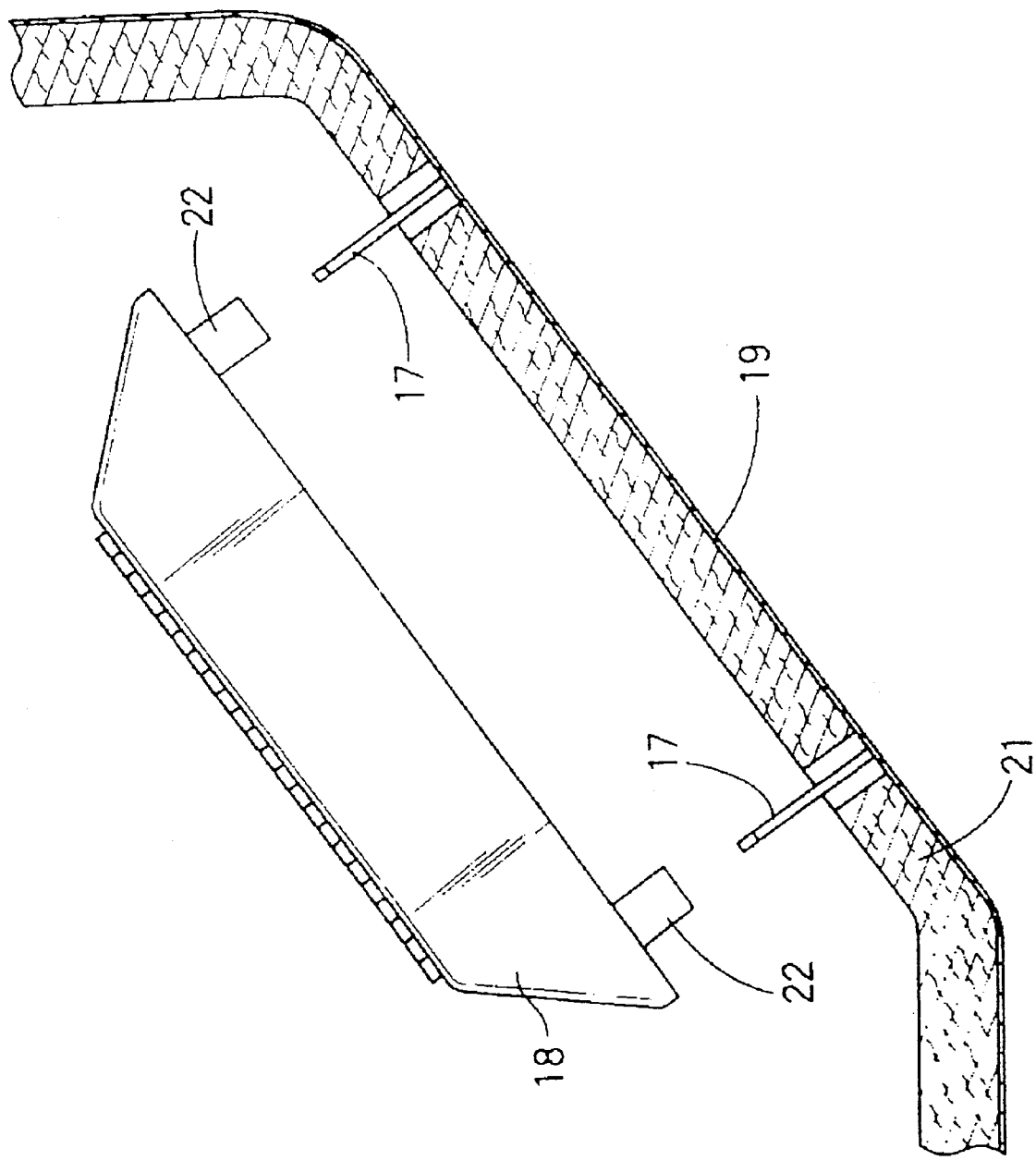
FIG. 5 shows the condition of the footrest before attaching on the car body.
Figure 6:
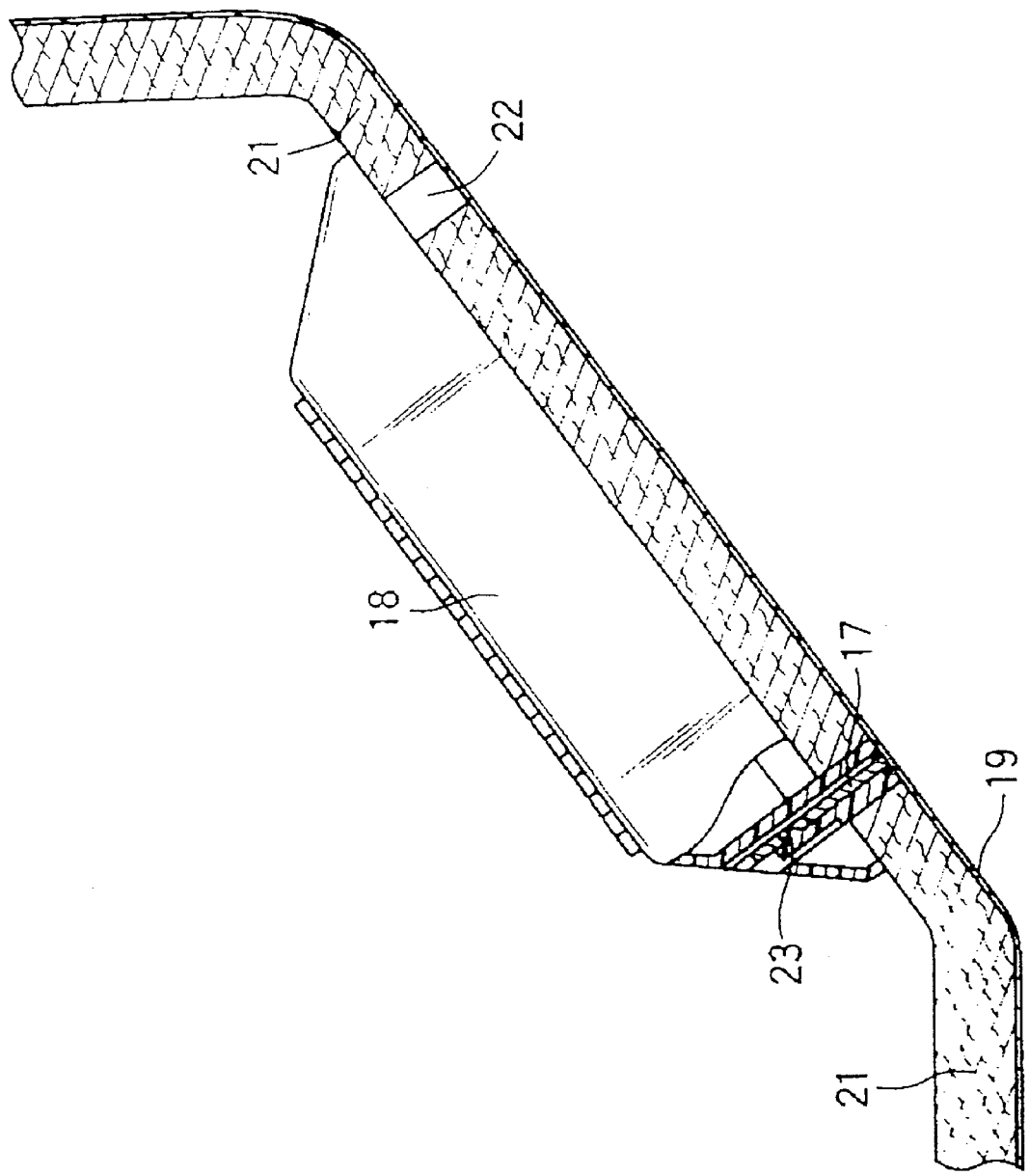
FIG. 6 shows the condition of the footrest after attaching on the car body.

FIGS. 4–6 show an embodiment in which a footrest 18 is attached onto the car body (base member) using a component holding weld bracket 17 according to the present invention. As seen in the weld bracket 1 of FIG. 1, the bracket 17 in FIG. 4 is formed with a welding portion 5, non-welding portions 6, and arc-obstructing grooves 7 and is also provided with an engaging opening 19 in the upper portion of the bracket 17. As shown in FIG. 5, the weld bracket 17 is welded to the car body 19 using a welding machine. Now, the outline of welding operation will be explained. First, the weld bracket 17 is held in the gun of the welding machine. Next, the bracket 17 is moved at a predetermined position of the car body so as to bring it come into contact with the car body. Then the welding machine is activated to generate a pilot arc between the weld bracket 17 and the predetermined position of the car body within an inert gas atmosphere. Subsequently, the bracket 17 is pulled up slightly from the car body to produce a main arc. Finally, the tip of the welding portion 5 is urged to the base member in timed relationship, finishing the welding operation.

As shown in FIG. 5, the brackets 17 are welded at two predetermined positions on the car body as described above. A carpet 21 is laid on the upper surface of the car body 19, and then a footrest 18 is attached to put the carpet 21 down. The footrest 18 is provided with a tubular engaging legs 22 to receive and engage the bracket 17. As shown in FIG. 5, the footrest 18 is pushed toward the car body 19 so that the engaging legs 22 extending from the footrest 18 receive the brackets 17. FIG. 6 shows the pushed down condition, wherein the footrest 18 has been attached onto the car body 19 through the bracket 17 while putting down the carpet 21. Each of the engaging legs 22 is provided with a engaging pawl 23 for engaging an opening 19 (see FIG. 4) of the bracket 17. When the footrest 18 is pressed down on the carpet 21 by a predetermined depth, the engaging pawl 23 fits into the opening 19, thereby attaching the footrest 18 onto the car body 19. In this way, the bracket can be conveniently used for attachment of the components.

What is claimed is:

1. A plate-like component holding weld bracket having a certain thickness and a predetermined length, wherein the bracket includes an end surface along one of the sides thereof said end surface comprising a welding portion to be welded to a base member, said bracket further including a non-welding portion along the same side as the welding portion and adjacent to the welding portion; an arc-obstructing groove being formed at the boundary between said welding portion and said non-welding portion; to end surface of said non-welding portion to prevent a discharge arc from transferring from the welding portion to the non-welding portion; the end surface of said non-welding portion being spaced from the surface of the base member when said end surface of said welding portion is in contact with the surface; and the end surface of the non-welding portion to contact the surface of the base member to limit the descent of the welding portion upon it being welded to said surface thereby controlling the height of the said bracket.

2. A weld bracket as claimed in claim 1 and including two of said non-welding portions located at each end of said welding portion.

3. A weld bracket as claimed in claim 2 wherein said welding portion and said non-welding portions are aligned in a straight line.

4. A weld bracket as claimed in claim 2 wherein said non-welding portions are disposed at an angle to said welding portion.

5. A weld bracket as claimed in claim 1 wherein said bracket includes a component-receiving structure spaced from said welding portion, said structure being adapted to receive and attach a component to the base member.

6. A plate-like component holding weld bracket for mounting a footrest to a base member, the bracket comprising:

a. a top surface formed at one end of the bracket;

b. a bottom surface formed at the other end of the bracket;

c. the bottom surface having a welding portion to be welded to the base member, a non-welding portion to contact the base member upon the welding portion being welded to the base member to set the height of the top of the bracket above the base member and an arc-obstructing groove being formed between the welding portion and the non-welding portion of the bracket to prevent a discharge arc from transferring from the welding portion to the non-welding portion; and d. the bracket of predetermined length from the top surface to the non-welding portion of the bottom surface thereof.

* * * * *